US007061360B2

(12) United States Patent
Richardson et al.

(10) Patent No.: US 7,061,360 B2
(45) Date of Patent: Jun. 13, 2006

(54) TRANSFORMER/RECTIFIER ARRANGEMENT

(75) Inventors: Robert Richardson, Essex (GB); Stephen Mark Iskander, Essex (GB); Matthew Kevin Hicks, Essex (GB)

(73) Assignee: E2V Technologies (UK) Limited, Essex (GB)

( * ) Notice: Subject to any disclaimer, the term of this patent is extended or adjusted under 35 U.S.C. 154(b) by 0 days.

(21) Appl. No.: 10/734,605

(22) Filed: Dec. 15, 2003

(65) Prior Publication Data

US 2004/0174145 A1 Sep. 9, 2004

Related U.S. Application Data

(63) Continuation of application No. PCT/GB02/02733, filed on Jun. 14, 2002.

(30) Foreign Application Priority Data

Jun. 15, 2001 (GB) ................................ 0114678.6

(51) Int. Cl.
*H01F 5/00* (2006.01)
*H02M 3/00* (2006.01)
*H02M 1/00* (2006.01)

(52) U.S. Cl. ........................................ 336/200; 363/15

(58) Field of Classification Search .................. 363/15, 363/16, 52, 53, 55, 56.1, 125, 126, 141, 144, 363/147; 336/15, 65, 73, 84 R, 84 C, 177, 336/200, 208, 220
See application file for complete search history.

(56) References Cited

U.S. PATENT DOCUMENTS

| | | | | |
|---|---|---|---|---|
| 4,156,829 | A | 5/1979 | Harada | |
| 4,292,665 | A | 9/1981 | Hersom et al. | |
| 4,506,320 | A * | 3/1985 | Koroncai et al. | 363/141 |
| 4,507,531 | A * | 3/1985 | Teich et al. | 219/718 |
| 4,525,774 | A * | 6/1985 | Kino et al. | 363/17 |
| 4,807,105 | A | 2/1989 | Varjasi et al. | |
| 4,873,757 | A | 10/1989 | Williams | |
| 5,285,369 | A * | 2/1994 | Balakrishnan | 363/49 |
| 5,991,178 | A | 11/1999 | Arnould | |
| 6,181,576 | B1 * | 1/2001 | Ikeda et al. | 363/17 |
| 6,222,742 | B1 * | 4/2001 | Schlecht | 363/16 |
| 6,490,180 | B1 * | 12/2002 | Hiltunen et al. | 363/21.16 |

FOREIGN PATENT DOCUMENTS

| | | |
|---|---|---|
| EP | 0 291 093 A3 | 11/1988 |
| EP | 0 314 287 A1 | 3/1989 |
| EP | 0 352 969 A3 | 1/1990 |
| EP | 0 896 346 | 2/1999 |
| GB | 1 090 995 | 11/1967 |
| GB | 1 509 563 | 5/1978 |
| GB | 2 136 221 A | 9/1984 |
| GB | 2 227 126 A | 7/1990 |
| GB | 2 287 359 A | 9/1995 |

* cited by examiner

*Primary Examiner*—Matthew V. Nguyen
(74) *Attorney, Agent, or Firm*—Venable LLP; Robert Kinberg; Steven Schwarz

(57) ABSTRACT

A rectifier transformer comprises two secondary windings, preferably with a single turn on each winding. The rectifier diodes form an integral part of each of the secondary windings. Thus, a compact arrangement is realised. In a high voltage application, the rectifier diodes comprise a plurality of relatively low voltage diodes in parallel to one another. The overall capacitance of the rectifier circuit is reduced by this arrangement.

6 Claims, 3 Drawing Sheets

TRANSFORMER/RECTIFIER ARRANGEMENT

CROSS-REFERENCE TO RELATED APPLICATION

This is a continuation of International Patent Application No. PCT/GB02/02733 filed Jun. 14, 2002, designating the United States and claiming priority of British Patent Application No. 0114678.6 filed Jun. 15, 2001, the disclosures of both foregoing applications being incorporated herein by reference.

BACKGROUND OF THE INVENTION

The present invention relates to electrical transformer/rectifier arrangements.

Transformers are well known in the art for transforming electrical energy at an alternating voltage into electrical energy at another usually different alternating voltage without change of frequency. Transformers depend upon mutual induction and essentially consist of two electrical circuits magnetically coupled together. The usual construction comprises two coils or windings with a magnetic core disposed between them. The primary circuit receives energy from an AC supply whilst the secondary circuit delivers energy to a load, usually at a different voltage.

Often a DC voltage is required from the transformer and the AC voltage in the secondary circuit is rectified. FIG. 1 shows a transformer having rectified secondary circuit known in the art. Primary circuit 10 comprises a primary coil 12 with an alternating voltage applied across it. The core 14 and secondary coil 16 complete the transformer. The alternating voltage induced in the secondary coil 16 is rectified by diodes 18 and 20 and capacitor 22 provide a steady DC supply to the load, not shown.

However, for example, in high voltage applications this rectified transformer arrangement can cause problems. The rectifier diodes can have excessive capacitance that degrades the voltage signal to the load. Furthermore, such systems and their components can be bulky and expensive.

SUMMARY OF THE INVENTION

The present invention aims to ameliorate the problems associated with the prior art discussed above, and in its broadest form, provides a rectifier transformer arrangement in which the rectifier components form a part of the secondary winding.

More specifically, the present invention provides a transformer comprising a primary winding, a secondary winding and a rectifier comprising a diode for rectifying voltage induced in the secondary winding, wherein the secondary winding comprises at least two coils, each coil including a rectifier diode as an integrated part of the coil.

The arrangement of the present invention has the advantage that the rectifier diodes are arranged as an integral part of the secondary winding, thus reducing the space occupied by the transformer/rectifier. Furthermore, the secondary winding can be constructed on printed circuit boards disposed either side of the primary winding, connected by the rectifier diodes and an electrical connector rod to form a single turn secondary winding. In this arrangement, two secondary windings, each of a single turn, can be provided. Moreover, using many diodes in parallel to one another reduced the overall capacitance and cost of the rectifier. The reduction in capacitance is especially useful for high voltage circuit applications.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
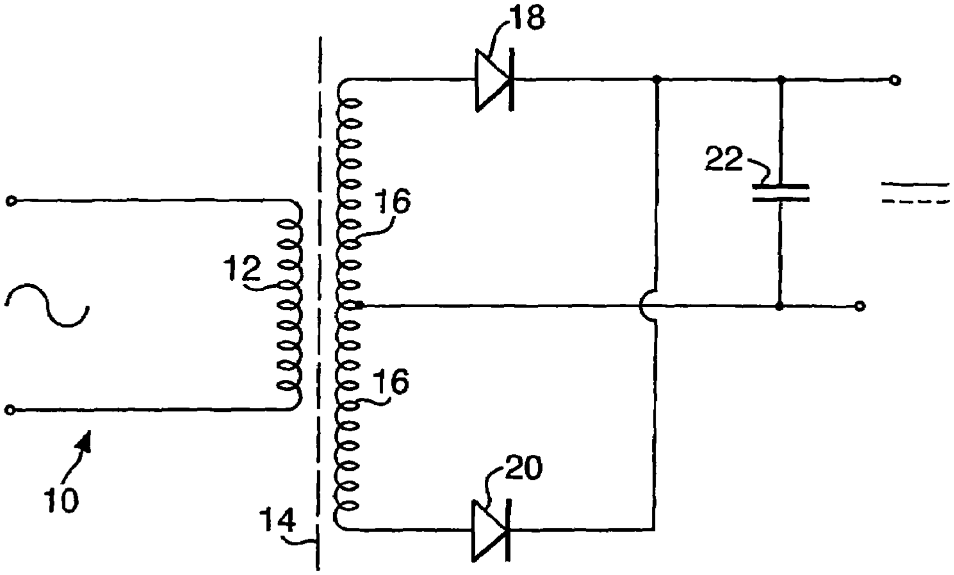
FIG. 1 (referred to above) is a circuit diagram of a prior art rectifier/transformer described above.
Figure 2:
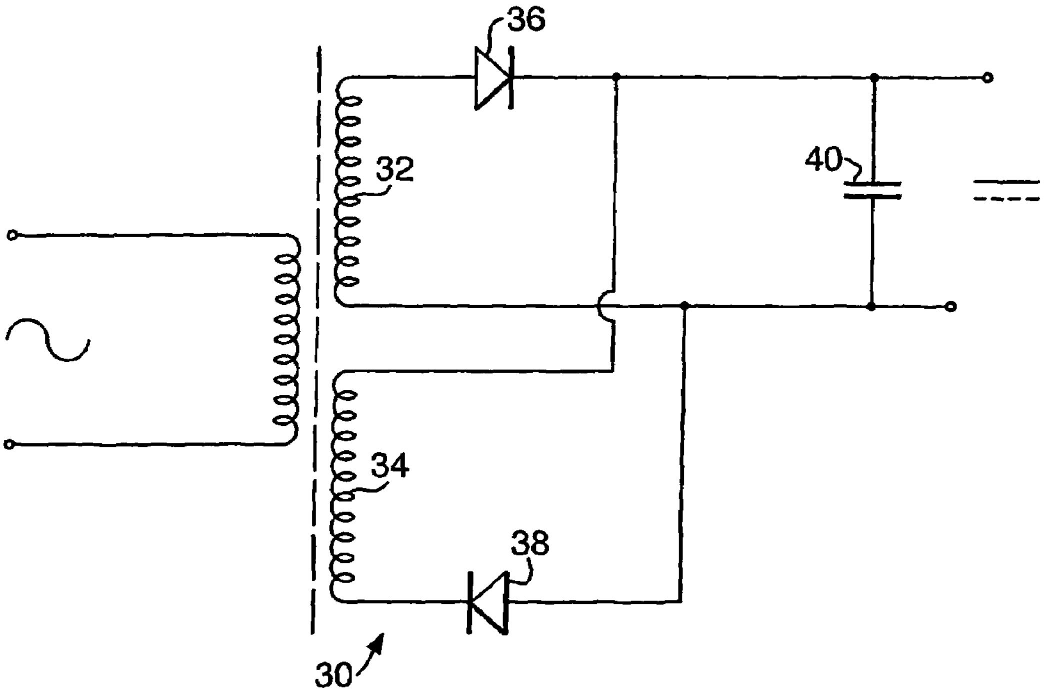
FIG. 2 is a circuit diagram of an embodiment of the present invention.

Referring to FIG. 2, a transformer/rectifier 30 arrangement is shown. The secondary coil is split into two discrete windings 32,34. Diodes 36,38 and capacitor 40 rectify the alternating voltage induced in the secondary coils to provide a steady DC voltage to the load, not shown. The circuit in FIG. 2 behaves in the same manner as that shown in FIG. 1, however there are important advantages of the circuit shown in FIG. 2 that are not present in prior art devices.

Figure 3:
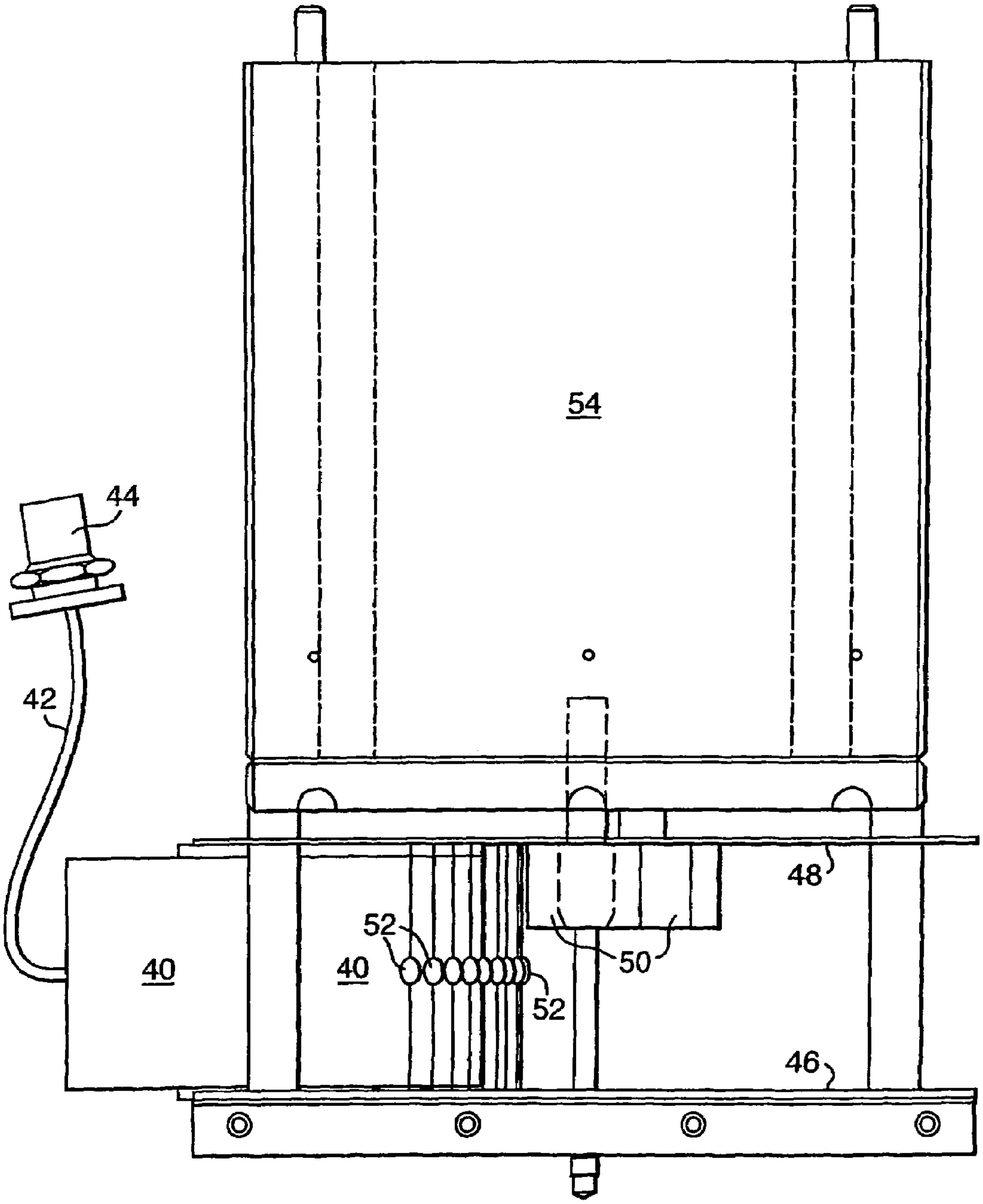
FIGS. 3 and 4 are views of a transformer/rectifier arrangement embodying the present invention from the top and side respectively.

Referring to FIG. 3, a transformer primary coil and transformer core are housed in a cylindrical insulating plastic housing 40. Voltage is supplied to the primary coil by a cable 42 and cable socket 44. Printed circuit boards 46,48 are disposed on either side of the primary coil housing 40. Electronic components 50 are disposed on circuit board 48 and include a capacitor as part of a rectifier circuit. The rectifier circuit is completed by diodes 52 disposed between the circuit boards 46,48. The diodes are arranged in parallel and have the electrical characteristics of a single diode. The load to the transformer (not shown).

Each of the two secondary windings of the transformer is a single turn coil comprising conductive strips (shown in FIG. 4) printed on each of the circuit boards 46,48, connected by a central connector (not shown) passing through the centre of the primary coil/core housing 40, and the diodes 52. The diodes form an integral part of each secondary coil.

Figure 4:
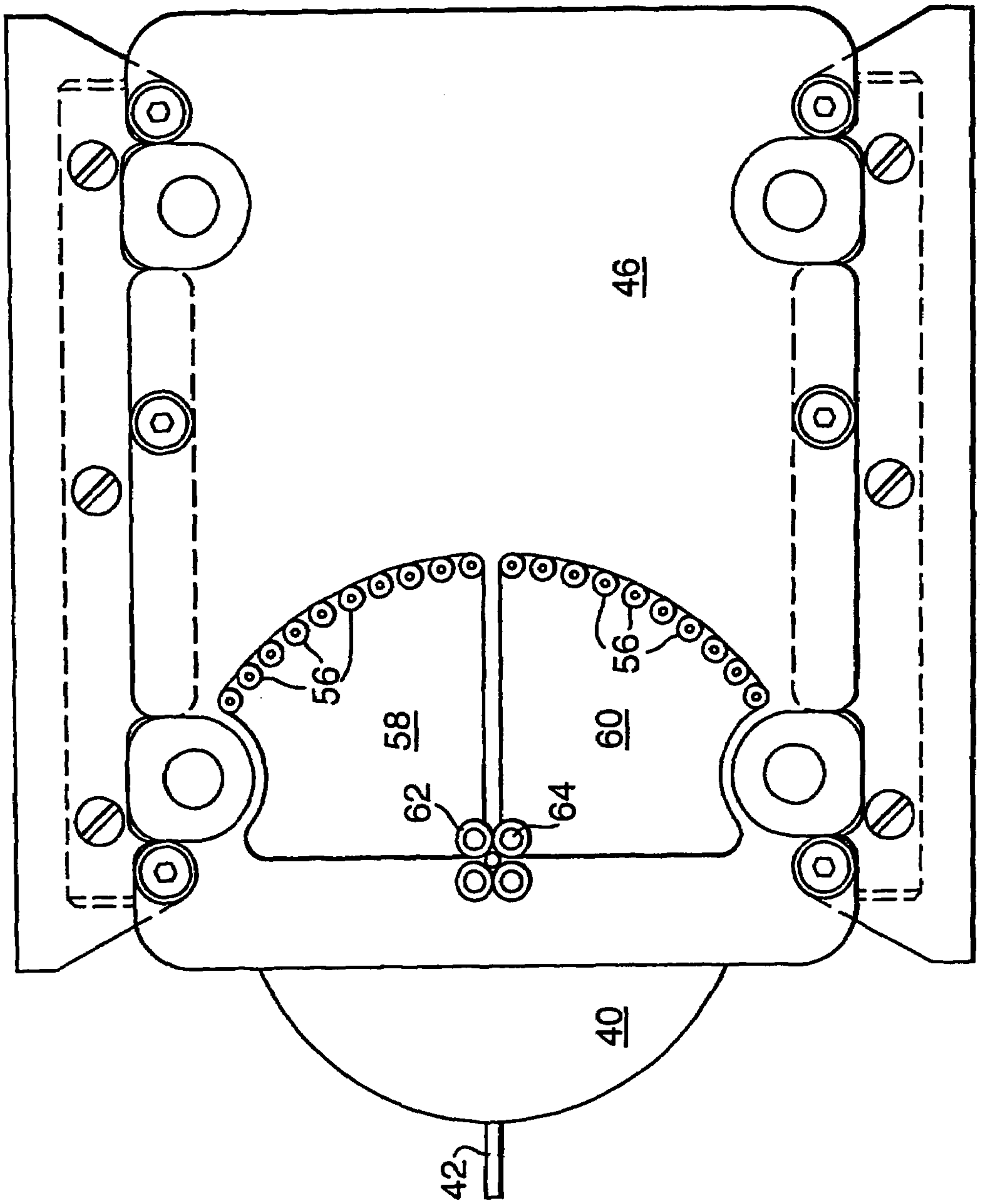

Referring to FIG. 4, the cylindrical primary coil block 40 protrudes from circuit board 46. The end pins 56 of the diodes 52 pass through the board 46. Conductive strips 58,60 connect the diodes to the connectors 62,64 passing through the primary coil/core housing 40. So, two discrete single winding secondary coils are formed. As can be seen from FIG. 4, the secondary windings, including the diodes, form an arc around the outside of the primary coil housing 40.

The diodes connected to strip 58 are arranged in the opposite orientation to the diodes connected to strip 60. Circuit board 48 has a similar pair of conductive strips that connect the other ends of the connectors 62,64 to the electronic components on the board to complete each secondary loop circuit. In this way, a compact arrangement of the circuit shown in FIG. 2 can be realised.

Such a transformer/rectifier arrangement can be used, for example, to drive a heater of a pulsed magnetron device. In such an application high voltages in the order of 60 kV are required on the heater. The magnetron heater voltage is isolated from the supply voltage by the transformer arrangement. It is preferable to drive the heater with a DC voltage, although a VHF AC voltage could be used. It is also desirable to change the heater voltage as the magnetron is operated to compensate for fluctuations of primary and secondary emissions from the heater element, for example, as the magnetron warms up.

The embodiment shown in FIGS. 3 and 4 can be used in such a magnetron application, as well as in other applications, and has several advantages over prior art systems. By placing many relatively small diodes in parallel to one another the overall capacitance of the rectifier circuit is reduced. For example, the overall capacitance can be reduced from roughly 1000 pF to 9 pF by replacing a single diode on each secondary coil with 10 diodes in arranged in parallel to one another. Furthermore, a single, high voltage diode is very much more expensive than many low voltage diodes arranged in parallel. This is particularly important in high voltage applications, such as is required for magnetron heaters.

Moreover, a single diode would have to be placed on a heat sink to dissipate heat energy from it. The embodiment shown in FIGS. 3 and 4 can be immersed in a dielectric oil to directly insulate and cool the components. The oil may form part of a larger oil coolant/insulant reservoir as described in a system of our application GB-A-2356752.

Preferably, an electro-static shield is placed around the primary winding of the transformer to screen it from any electro-static charge created in the circuit. The shield is particularly important in HV environments; such a HV environment might be experienced in a pulsed magnetron device. The shield (not shown in FIGS. 3 and 4) is disposed between the primary and secondary winding and inside the block 40. In certain circumstances the shield can be extended to screen the secondary winding also.

The embodiment described provides a compact arrangement suitable for use, for example, with medical magnetron drivers or radar systems. Other systems requiring high voltage rectified transformers will also be able to take advantage of the present invention.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A transformer comprising a primary winding, a secondary winding and a rectifier comprising a diode for rectifying voltage induced in the secondary winding, wherein the secondary winding comprises two coils, each coil including a rectifier diode as an integrated part of the coil, wherein the diode of each coil comprises a plurality of diodes connected in parallel to each other and wherein the plurality of diodes of one secondary coil are arranged in opposite direction to the diodes of the other secondary coil.

2. The transformer according to claim 1, wherein each of the two secondary coils is a single turn winding.

3. The transformer according to claim 1, wherein each of the two coils comprises a conductive strip on two printed circuit boards, and a connector for electrically connecting the conductive strips of each of the two secondary coils.

4. The transformer according to claim 1, wherein the transformer is operable at high voltage.

5. The transformer according to claim 1, adapted for supplying power to a magnetron heater.

6. The transformer according to claim 5, wherein the magnetron is a pulsed magnetron.

* * * * *